(12) United States Patent
Sugahara et al.

(10) Patent No.: US 10,530,567 B2
(45) Date of Patent: Jan. 7, 2020

(54) ENCRYPTION DEVICE AND MEMORY DEVICE

(71) Applicant: MegaChips Corporation, Osaka-shi (JP)

(72) Inventors: Takahiko Sugahara, Yodogawa-ku (JP); Hiromu Yutani, Taipei (TW); Hajime Yoshimura, Yodogawa-ku (JP); Masayuki Imagawa, Yodogawa-ku (JP)

(73) Assignee: MEGACHIPS CORPORATION, Osaka (JP)

( * ) Notice: Subject to any disclaimer, the term of this patent is extended or adjusted under 35 U.S.C. 154(b) by 207 days.

(21) Appl. No.: 15/723,911

(22) Filed: Oct. 3, 2017

(65) Prior Publication Data
US 2018/0097613 A1    Apr. 5, 2018

(30) Foreign Application Priority Data

Oct. 5, 2016   (JP) ................................. 2016-197138
Jan. 21, 2017  (JP) ................................. 2017-009035

(51) Int. Cl.
*H04L 29/06*    (2006.01)
*H04L 9/00*     (2006.01)
*H04L 9/06*     (2006.01)
*G06F 7/58*     (2006.01)

(52) U.S. Cl.
CPC .............. *H04L 9/003* (2013.01); *G06F 7/582* (2013.01); *H04L 9/0631* (2013.01); *H04L 9/0662* (2013.01); *H04L 9/0668* (2013.01); *H04L 2209/12* (2013.01)

(58) Field of Classification Search
CPC ..... H04L 9/003; H04L 9/0668; H04L 9/0631; H04L 9/0662; H04L 2209/12; G06F 7/582
See application file for complete search history.

(56) References Cited

U.S. PATENT DOCUMENTS

| 8,583,944 | B1* | 11/2013 | Trimberger | G06F 11/3058 380/29 |
| 2003/0219126 | A1* | 11/2003 | Wuidart | G06K 19/07363 380/210 |
| 2007/0286413 | A1* | 12/2007 | Derouet | H04L 9/004 380/28 |
| 2010/0322364 | A1* | 12/2010 | Bogdan | H04L 27/2649 375/350 |
| 2013/0129081 | A1* | 5/2013 | Guillet | H04L 9/0618 380/28 |

(Continued)

OTHER PUBLICATIONS

Paul Kocher et al. "Introduction to Differential Power Analysis and Related Attacks," Cryptography Research htttp://www.cryptography.com/, 1998, pp. 5.

(Continued)

*Primary Examiner* — Mahfuzur Rahman
(74) *Attorney, Agent, or Firm* — Xsensus LLP

(57) ABSTRACT

A noise generation module generates power consumption noise to conceal the power consumption characteristics of a cryptographic module. The cryptographic module performs first non-linear transformation on received data, and the noise generation module performs second non-linear transformation on received data during the operational period of the first non-linear transformation.

10 Claims, 9 Drawing Sheets

(56) References Cited

U.S. PATENT DOCUMENTS

2017/0082680 A1* 3/2017 Eck .................... G01R 31/2815

OTHER PUBLICATIONS

Eric Brier et al. "Correlation Power Analysis with a Leakage Model," Gemplus Card International, France Security Technology Department, IACR Eprint archive, 2004, pp. 14.

Daisuke Suzuki et al. "Random Switching Logic: A Countermeasure against DPA based on Transition Probability," IACR Eprint archive, 2004, pp. 16.

* cited by examiner

<u>3 2</u>

ENCRYPTION DEVICE AND MEMORY DEVICE

CROSS REFERENCE TO RELATED APPLICATIONS

The present application is based on, and claims priority from Japanese Patent Application Serial Numbers 2016-197138 and 2017-009035, the disclosure of which is hereby incorporated by reference herein in its entirety.

BACKGROUND

Technical Field

The present disclosure relates to encryption devices and memory devices.

Related Art

Cryptosystems currently in use are perceived to be computationally secure against cryptanalysis. Actually providing a cryptographic module in an encryption device, however, may result in leaks caused by, for example, power consumption and processing time. Threats of side channel attacks are increasing, in an attempt to illicitly obtain secret information such as secret keys by observing these operational conditions by various physical means.

Examples of side channel attacks include power analysis attacks which are conducted to analyze secret information by studying the power consumption of a device. There is a report that Differential Power Analysis (DPA) and Correlation Power Analysis (CPA), which are an analysis of power consumption measurements by statistical functions, are one of the most powerful attacks among such side channel attacks (See Paul Kocher et al., "Introduction to Differential Power Analysis and related Attacks," [online], Cryptography Research, searched in the Internet on Jul. 1, 2015, <http://www.cryptography.com/public/pdf/DPATechInfo.pdf>, and Eric Brier et al., "Correlation Power Analysis with a Leakage Model," [online], Gemplus Card International, searched in the Internet on Sep. 12, 2016, <https://www.iacr.org/archive/ches2004/31560016/31560016.pdf>).

Various circuits are proposed as a countermeasure against the DPA and CPA attacks. For example, Daisuke Suzuki et al. "Random Switching Logic: A Countermeasure against DPA based on Transition Probability," [online], International Association for Cryptologic Research, searched in the Internet on Jul. 1, 2015, <http://eprint.iacr.org/2004/346.pdf> propose Random Switching Logic (RSL) circuit and Wave Dynamic Differential Logic (WDDL) circuit. The RSL circuit switches an operational mode of a logic circuit with a random number, so as to eliminate a biased state transition probability, thereby randomizing power consumption to prevent estimation of a cryptographic key. The WDDL circuit reduces a difference in current consumption due to difference in bit values in an arithmetic operation with a complementary circuit after precharging, so as to render the power consumption uniform.

SUMMARY

An encryption device includes circuitry including a cryptographic module configured to encrypt received first data to output second data, and a noise generation module configured to generate power consumption noise to conceal power consumption characteristics of the cryptographic module. The cryptographic module is configured to perform first non-linear transformation on received data. The noise generation module is configured to perform second non-linear transformation on received data during an operational period of the first non-linear transformation.

An encryption device includes circuitry including a cryptographic module configured to encrypt received first data by hardware processing to output second data, and a noise generation module configured to generate power consumption noise by software processing to conceal power consumption characteristics of the cryptographic module.

A memory device configured to be connected to a host device includes a memory array configured to store content data and an encryption device configured to encrypt content data to be sent to the host device. The encryption device includes circuitry including a cryptographic module configured to encrypt received first data to output second data, and a noise generation module configured to generate power consumption noise to conceal power consumption characteristics of the cryptographic module. The cryptographic module is configured to perform first non-linear transformation on received data. The noise generation module is configured to perform second non-linear transformation on received data during an operational period of the first non-linear transformation.

DETAILED DESCRIPTION

Figure 1:
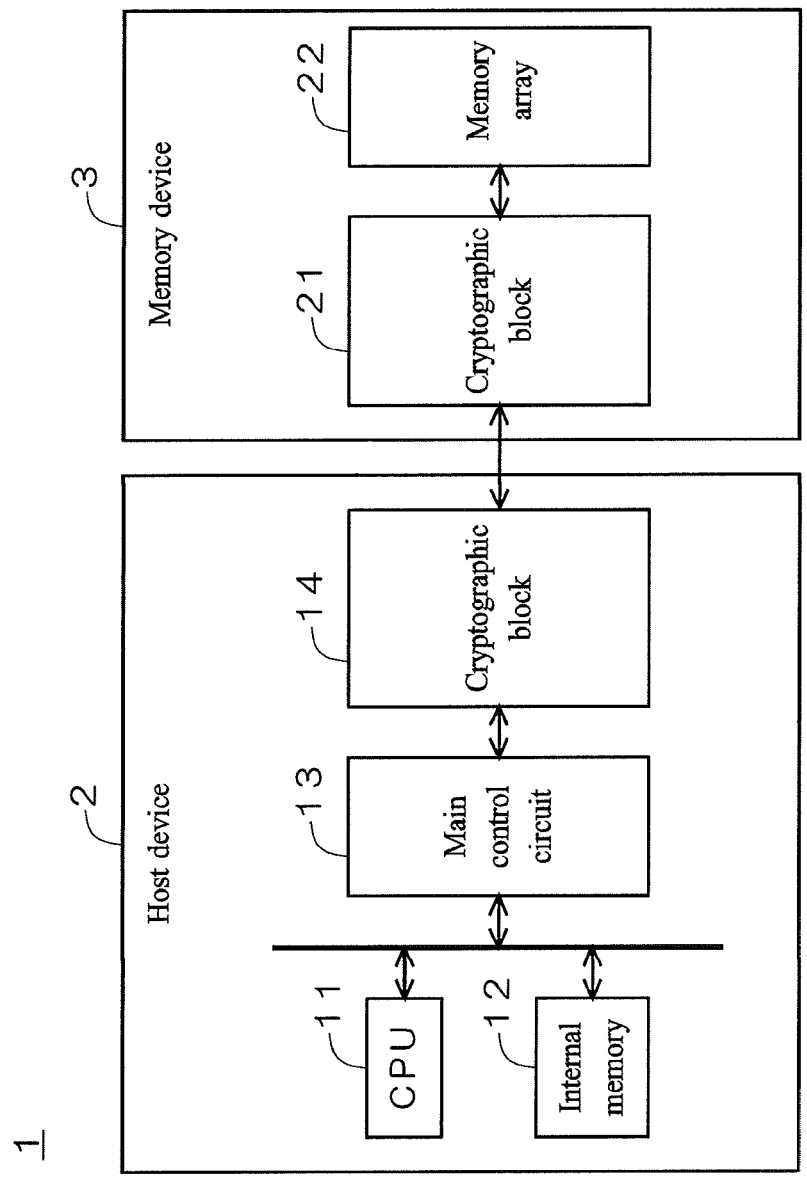
FIG. 1 is a diagram illustrating a configuration of a memory system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

Providing an encryption device with the above-described RSL or WDDL circuit causes increase in arithmetic operation time, circuit size and power consumption by several to several dozen times, in comparison to not providing such circuits, which results in increase in cost.

The present disclosure is directed to obtaining an encryption device, a memory device, a host device, and a memory system that are provided with an effective countermeasure against the DPA and CPA attacks readily and at low cost.

An encryption device according to an aspect of the present disclosure includes a cryptographic module configured to encrypt received first data to output second data, and a noise generation module configured to generate power consumption noise to conceal power consumption characteristics of the cryptographic module. The cryptographic module includes a first non-linear transformation processing unit configured to perform non-linear transformation on received data. The noise generation module includes a second non-linear transformation processing unit configured to perform non-linear transformation on received data during the operational period of the first non-linear transformation processing unit.

In the encryption device according to this aspect, the noise generation module includes the second non-linear transformation processing unit that performs non-linear transformation on received data during the operational period of the first non-linear transformation processing unit. Since non-linear transformation exhibits large power-consumption distribution in comparison to a common pseudo random number generator or the like, operating the second non-linear transformation processing unit during the operational period of the first non-linear transformation processing unit enables the noise generation module to generate largely-distributed power consumption noise. This largely-distributed power consumption noise effectively conceals the power consumption characteristics of the cryptographic module. Only the noise generation module needs to be additionally provided, with no need for changing the cryptographic algorithm of the cryptographic module, which helps avoid complicated design, increase in cost, and the like, that would otherwise be caused by redesigning the cryptographic module. In consequence, an effective countermeasure against DPA and CPA attacks is provided readily and at low cost.

In some embodiments, the first non-linear transformation processing unit includes a first non-linear transformation circuit configured to perform non-linear transformation by hardware processing. The second non-linear transformation processing unit includes at least one second non-linear transformation circuit configured to perform non-linear transformation by hardware processing.

According to such embodiments, the second non-linear transformation processing unit includes at least one second non-linear transformation circuit that performs non-linear transformation by hardware processing. Non-linear transformation by hardware processing by the second non-linear transformation circuit generates more largely-distributed power consumption noise than non-linear transformation by software processing, which effectively conceals the power consumption characteristics of the cryptographic module.

In some embodiments, the second non-linear transformation processing unit includes a plurality of the second non-linear transformation circuits connected in series.

According to such embodiments, the second non-linear transformation processing unit includes the second non-linear transformation circuits connected in series. Connecting the multiple second non-linear transformation circuits in series further increases the distribution of power consumption noise generated by the noise generation module, resulting in concealing the power consumption characteristics of the cryptographic module more effectively.

In some embodiments, the second non-linear transformation circuits are non-linear transformation circuits having a bit width and a circuit architecture equivalent to a bit width and a circuit architecture of the first non-linear transformation circuit.

According to such embodiments, the second non-linear transformation circuits have the same bit width and the same circuit architecture as the first non-linear transformation circuit. Employing the bit width and the circuit architecture common to the first and the second non-linear transformation circuits approximates the characteristics of the power consumption noise of the second non-linear transformation circuits to the power consumption characteristics of the first non-linear transformation circuit. In consequence, the power consumption characteristics of the cryptographic module are concealed more effectively by the power consumption noise generated by the noise generation module.

In some embodiments, the second non-linear transformation circuits are non-linear transformation circuits having a bit width larger than a bit width of the first non-linear transformation circuit.

According to such embodiments, the second non-linear transformation circuits have a bit width larger than that of the first non-linear transformation circuit. Since the power-consumption distribution becomes larger as the bit width increases, employing the second non-linear transformation circuits having a bit width larger than that of the first non-linear transformation circuit enables the noise generation module to generate power consumption noise more largely-distributed than the power consumption characteristics of the cryptographic module. In consequence, the power consumption characteristics of the cryptographic module are concealed more effectively by the power consumption noise generated by the noise generation module.

In some embodiments, the second non-linear transformation circuits are non-linear transformation circuits based on a circuit architecture having a power-consumption distribution larger than a power-consumption distribution of the first non-linear transformation circuit.

According to such embodiments, the second non-linear transformation circuits employ a circuit architecture having a power-consumption distribution larger than that of the first non-linear transformation circuit. For example, when the first non-linear transformation circuit is an S-box circuit in table method, S-box circuits based on composite-field technique are employed as the second non-linear transformation circuits. This enables the noise generation module to generate power consumption noise more largely-distributed than the power consumption characteristics of the cryptographic module. In consequence, the power consumption characteristics of the cryptographic module are concealed more effectively by the power consumption noise generated by the noise generation module.

In some embodiments, the second non-linear transformation circuit in a first stage is configured to receive one of the first data and the second data as an initial value.

According to such embodiments, the second non-linear transformation circuit in the first stage receives one of the first data and the second data as an initial value. Since the first data and the second data are variable with the entropy being ensured, inputting one of the first data and the second data to the second non-linear transformation circuit in the first stage enables operating the second non-linear transformation circuits using an initial value with the entropy being ensured. Moreover, no need for an additional computing unit such as a pseudo random number generator for generating an initial value with the entropy being ensured achieves simplified circuit configuration.

In some embodiments, the second non-linear transformation circuit in a first stage is configured to receive one of a predetermined fixed value and an undefined value as an initial value.

According to such embodiments, the second non-linear transformation circuit in the first stage receives one of a predetermined fixed value and an undefined value as an initial value. This achieves simplified device configuration, in comparison to the configuration where the first data or the second data is input to the second non-linear transformation circuit in the first stage as an initial value, with no need for wiring or the like for inputting the first data or the second data to the second non-linear transformation circuit in the first stage.

In some embodiments, the noise generation module further includes a synchronization control circuit configured to cause the second non-linear transformation circuits to operate in synchronization with operation of the first non-linear transformation circuit.

According to such embodiments, the noise generation module includes the synchronization control circuit that causes the second non-linear transformation circuits to operate in synchronization with operation of the first non-linear transformation circuit. As a result, transition of the power consumption by the cryptographic module synchronizes with transition of the power consumption noise generated by the noise generation module, and thus the power consumption characteristics of the cryptographic module are concealed more effectively by the power consumption noise.

In some embodiments, the noise generation module further includes a selection circuit configured to select a number of stages of the second non-linear transformation circuits to operate from all of the second non-linear transformation circuits.

According to such embodiments, the noise generation module includes the selection circuit that selects the number of stages of the second non-linear transformation circuits to operate from all of the second non-linear transformation circuits provided. When the effectiveness of concealing is highly required, the distribution of the power consumption noise generated by the noise generation module is effectively increased by setting a large number of the second non-linear transformation circuits to operate. On the other hand, when the effectiveness of concealing is not highly required, the power consumption of the encryption device as a whole is effectively reduced by setting a small number of the second non-linear transformation circuits to operate.

In some embodiments, the first non-linear transformation processing unit includes a first non-linear transformation circuit configured to perform non-linear transformation by hardware processing. The second non-linear transformation processing unit includes at least one data processing unit configured to perform non-linear transformation by software processing.

According to such embodiments, the second non-linear transformation processing unit includes at least one data processing unit that performs non-linear transformation by software processing. Since the data processing unit performs non-linear transformation by software processing and thus a non-linear transformation circuit configured as hardware is not required, an equivalent function can be additionally provided by the upgrade of firmware or the like. Therefore an effective countermeasure against DPA and CPA attacks is provided readily and at low cost.

In some embodiments, the data processing unit is configured to perform non-linear transformation with a bit width equivalent to a bit width of the first non-linear transformation circuit.

According to such embodiments, the data processing unit performs non-linear transformation with the same bit width as the first non-linear transformation circuit. Employing the bit width common to the first non-linear transformation circuit and the data processing unit approximates the characteristics of the power consumption noise of the data processing unit to the power consumption characteristics of the first non-linear transformation circuit. In consequence, the power consumption characteristics of the cryptographic module are concealed more effectively by the power consumption noise generated by the noise generation module.

In some embodiments, the data processing unit is configured to perform non-linear transformation with a bit width larger than a bit width of the first non-linear transformation circuit.

According to such embodiments, the data processing unit performs non-linear transformation with a bit width larger than that of the first non-linear transformation circuit. Since the power-consumption distribution becomes larger as the bit width increases, the data processing unit that performs non-linear transformation with a larger bit width than the first non-linear transformation circuit enables the noise generation module to generate power consumption noise more largely-distributed than the power consumption characteristics of the cryptographic module. In consequence, the power consumption characteristics of the cryptographic module are concealed more effectively by the power consumption noise generated by the noise generation module.

In some embodiments, the data processing unit is configured to receive one of the first data and the second data as an initial value.

According to such embodiments, the data processing unit receives one of the first data and the second data as an initial value. Since the first data and the second data are variable with the entropy being ensured, inputting one of the first data and the second data to the data processing unit enables the data processing unit to perform non-linear transformation using an initial value with the entropy being ensured. Moreover, no need for an additional computing unit such as a pseudo random number generator for generating an initial value with the entropy being ensured achieves simplified circuit configuration.

In some embodiments, the data processing unit is configured to receive a predetermined fixed value as an initial value.

According to such embodiments, the data processing unit receives a predetermined fixed value as an initial value. This facilitates the design, and reduces the load by software implementation, in comparison to the configuration where the first data or the second data is input to the data processing unit as an initial value.

In some embodiments, the second non-linear transformation processing unit includes a plurality of the data processing units. At least one nonoperational data processing unit of the plurality of the data processing units is configured to perform non-linear transformation.

According to such embodiments, the second non-linear transformation processing unit includes multiple data processing units. At least one nonoperational data processing unit of the data processing units performs non-linear transformation. When the second non-linear transformation processing unit includes multiple data processing units, causing nonoperational one of the data processing units to perform non-linear transformation realizes economical use of existing resources.

An encryption device according to another aspect of the present disclosure includes a cryptographic module configured to encrypt received first data by hardware processing to output second data, and a noise generation module configured to generate power consumption noise by software processing to conceal power consumption characteristics of the cryptographic module.

In the encryption device according to this aspect, the noise generation module generates power consumption noise to conceal the power consumption characteristics of the cryptographic module. Thus the power consumption noise generated by the noise generation module effectively conceals the power consumption characteristics of the cryptographic module. Only the noise generation module needs to be additionally provide, with no need for changing the cryptographic algorithm of the cryptographic module, which helps avoid complicated design, increase in cost, and the like, that would otherwise be caused by redesigning the cryptographic module. In consequence, a countermeasure against DPA and CPA attacks is provided readily and at low cost. The noise generation module generates power consumption noise by software processing. A noise generation module does not need to be additionally provided as hardware, and an equivalent function can be additionally provided by the upgrade of firmware or the like. Therefore a countermeasure against DPA and CPA attacks is provided readily and at low cost.

In some embodiments, the cryptographic module includes a non-linear transformation circuit configured to perform non-linear transformation on received data by hardware processing, and the noise generation module includes a data processing unit configured to perform non-linear transformation on received data by software processing during the operational period of the non-linear transformation circuit.

According to such embodiments, the noise generation module includes the data processing unit that performs non-linear transformation on received data by software processing during the operational period of the non-linear transformation circuit. Since non-linear transformation exhibits large power-consumption distribution in comparison to a common pseudo random number generator or the like, performing non-linear transformation by the data processing unit during the operational period of the non-linear transformation circuit enables the noise generation module to generate largely-distributed power consumption noise. This largely-distributed power consumption noise effectively conceals the power consumption characteristics of the cryptographic module.

A memory device according to another aspect of the present disclosure is configured to be connected to a host device. The memory device includes a memory array configured to store content data, and an encryption device according to the above-described aspects configured to encrypt content data to be sent to the host device.

The memory device according to this aspect is provided with an effective countermeasure against DPA and CPA attacks readily and at low cost.

A host device according to another aspect of the present disclosure is configured to accept a memory device. The host device includes a controller configured to issue a command to the memory device, and an encryption device according to the above-described aspects configured to encrypt a command to be sent to the memory device.

The host device according to this aspect is provided with an effective countermeasure against DPA and CPA attacks readily and at low cost.

A memory system according to another aspect of the present disclosure includes a memory device according to the above-described aspect and a host device according to the above-described aspect.

The memory system according to this aspect provides the memory device and the host device with an effective countermeasure against DPA and CPA attacks readily and at low cost.

According the present disclosure, an effective countermeasure against DPA and CPA attacks is provided readily and at low cost.

These and other objects, features, aspects and advantages of the present disclosure will become more apparent from the following detailed description when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

FIG. 1 is a simplified diagram illustrating a configuration of a memory system 1 according to an embodiment of the present disclosure. As illustrated in FIG. 1 the memory system 1 includes a host device 2, and a memory device 3 such as a semiconductor memory detachably connected to the host device 2.

The host device 2 includes a CPU 11, an internal memory 12, a main control circuit 13, and a cryptographic block 14. The memory device 3 includes a cryptographic block 21 similar to the cryptographic block 14, and a memory array 22 for storing arbitrary data such as content data. The cryptographic blocks 14 and 21 perform encryption and decryption on commands or data transmitted/received between the host device 2 and the memory device 3.

Figure 2:
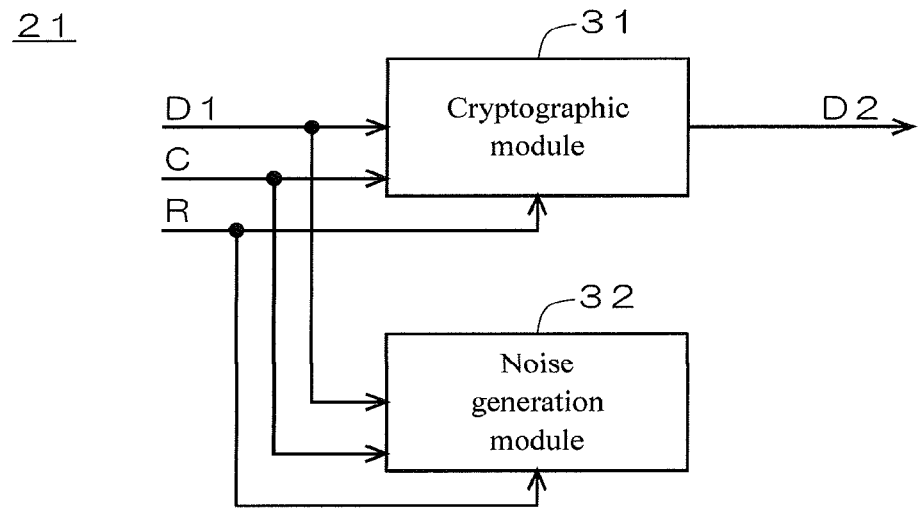
FIG. 2 is a diagram illustrating a configuration of a cryptographic block of a memory device.
Figure 3:
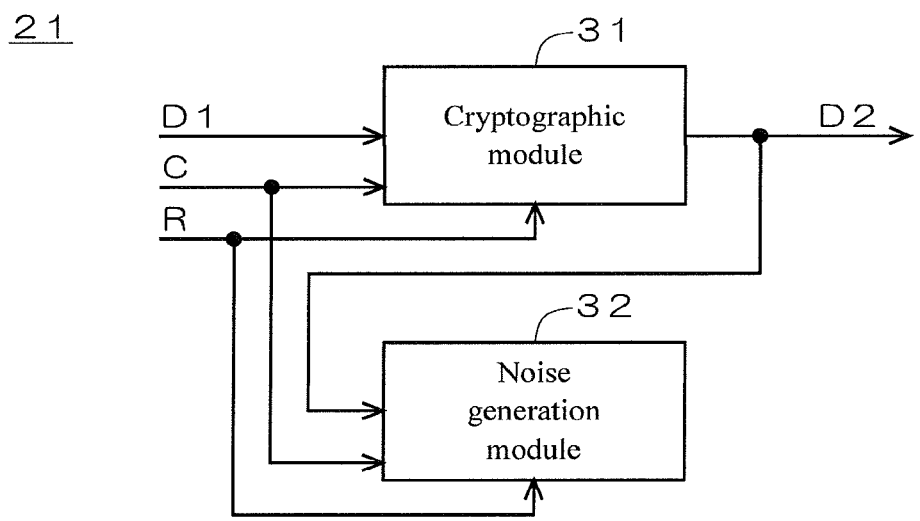
FIG. 3 is a diagram illustrating a modification of the cryptographic block of the memory device.

FIG. 2 is a diagram illustrating a configuration of the cryptographic block 21 of the memory device 3. As illustrated in FIG. 2, the cryptographic block 21 includes a cryptographic module 31 and a noise generation module 32, both of which are configured as hardware. The cryptographic module 31 and the noise generation module 32 are provided in the same IC chip. The cryptographic module 31 and the noise generation module 32 receive input data D1, an operation clock C, and a reset signal R. Alternatively, the noise generation module 32 may receive output data D2 from the cryptographic module 31, instead of the input data D1 to the cryptographic module 31, as illustrated in the modification in FIG. 3.

In sending content data read from the memory array 22 to the host device 2, the cryptographic module 31 encrypts the plaintext input data D1 (content data) to output ciphertext output data D2. On receiving an encrypted command from the host device 2, the cryptographic module 31 decrypts the ciphertext input data D1 (encrypted command) to output plaintext output data D2. In the example of the present embodiment, the cryptographic module 31 employs the Advanced Encryption Standard (AES) as a cryptographic algorithm. Since the side channel attack targets the power consumption of the cryptographic module 31 for analysis, the noise generation module 32 generates power consumption noise to conceal the power consumption characteristics of the cryptographic module 31.

Figure 4:
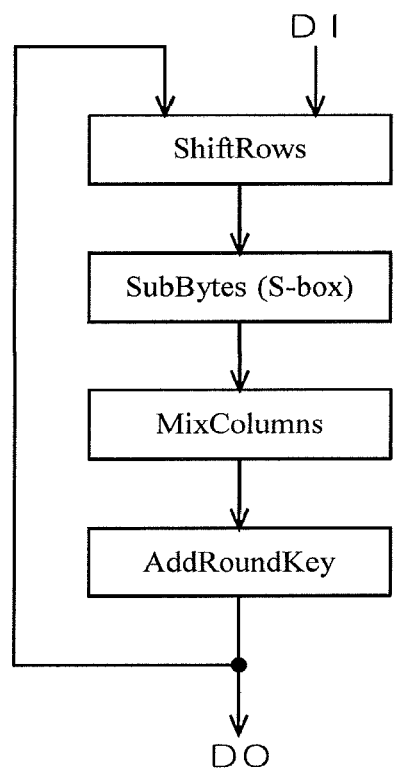
FIG. 4 is a simplified diagram illustrating a standard circuit configuration for AES encryption circuit.

FIG. 4 is a simplified diagram illustrating a standard circuit configuration for AES encryption circuit. As illustrated in FIG. 4, AES is based on a cryptographic algorithm in which four fundamental operations (ShiftRows/SubBytes/MixColumns/AddRoundKey) are repeatedly performed on input data DI having a predetermined number of bits for predetermined number of rounds to obtain output data DO. The arithmetic circuit of SubBytes includes a non-linear transformation circuit for performing non-linear transformation called S-box on input data to itself (hereinafter "S-box circuit"). Representative circuit architectures of S-box circuits include table method where the results of inverse arithmetic and affine transformation are realized by a truth table, and composite-field technique where independently-provided inverse arithmetic circuit and affine transformation circuit are connected in series. S-box circuits in table method exhibit high resistance to side channel attacks (tamper resistance) with comparatively small power-consumption distribution, while they require large amount of resources. In contrast, S-box circuits based on composite-field technique require small amount of resources, while they exhibit low tamper resistance with comparatively large power-consumption distribution. In the example of the present embodiment, the cryptographic module 31 employs the S-box circuit based on composite-field technique for economy of resources. In AES, the S-box circuit has a bit width of 8 bits.

Figure 5:
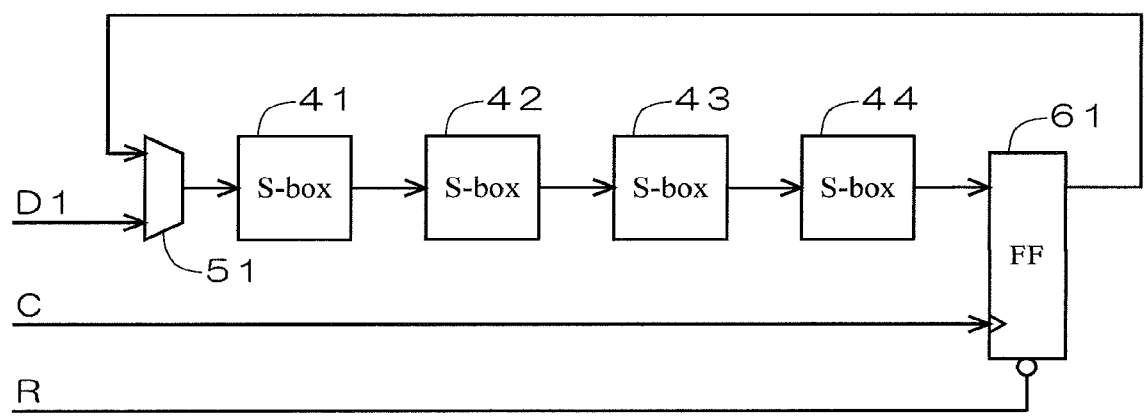
FIG. 5 is a diagram illustrating a circuit configuration of a noise generation module illustrated in FIG. 2.

FIG. 5 is a diagram illustrating a circuit configuration of the noise generation module 32 illustrated in FIG. 2. FIG. 5 illustrates a connection in the noise generation module 32 including a selector 51 serving as a selection circuit, multiple S-box circuits 41 to 44 connected in series (four stages in this example), and a flip-flop 61 serving as a synchronization control circuit. The stages of the S-box circuits can be set to any number greater than or equal to one as required in accordance with desired tamper resistance. The tamper resistance becomes higher as the number of the stages of the S-box circuits increases.

The selector 51 has a first input terminal for receiving the input data D1. The selector 51 also has a second input terminal connected to the output terminal of the flip-flop 61, so that the output from the S-box circuit 44 in the last stage is fed back to the input to the S-box circuit 41 in the first stage. The S-box circuits 42 to 44 receive data output from the preceding S-box circuits 41 to 43. The S-box circuits 41 to 44 perform non-linear transformation on data input to them. The S-box circuits 41 to 44 in the example of the present embodiment employ an S-box circuit having a circuit architecture based on composite-field technique with a bit width of 8 bits, in a similar way to the cryptographic module 31.

Referring to FIGS. 2 and 5, the cryptographic module 31 and the noise generation module 32 receive a common reset signal R. On assertion of the reset signal R, the cryptographic module 31 and the noise generation module 32 start their operations. On negation of the reset signal R, the cryptographic module 31 and the noise generation module 32 stop their operation. The cryptographic module 31 performs encryption or decryption on the input data D1 in synchronization with the operation clock C.

Referring to FIG. 5, the input data D1 is input to the first input terminal of the selector 51. When the noise generation module 32 starts its operation, the selector 51 selects the first input terminal, so that the input data D1 is input to the S-box circuit 41 in the first stage as an initial value. The selector 51 thereafter selects the second input terminal, so that output from the S-box circuit 44 in the last stage is input to the S-box circuit 41 in the first stage via the flip-flop 61 serving as a latch circuit. The flip-flop 61 receives the operation clock C and performs the latch operation in synchronization with the operation clock C, so that the S-box circuits 41 to 44 also operate in synchronization with the operation clock C. Since the cryptographic module 31 also receives the same operation clock C, the S-box circuit in the cryptographic module 31 and the S-box circuits 41 to 44 in the noise generation module 32 operate in synchronization.

In the example of the present embodiment, the cryptographic block 14 of the host device 2 has the same configuration as the cryptographic block 21 of the memory device 3. When the CPU 11 issues a command such as read and write commands to the memory device 3, the command is input to the cryptographic block 14 via the main control circuit 13. The cryptographic block 14 encrypts a plaintext command to generate an encrypted command. The encrypted command is sent from the host device 2 to the memory device 3. When the host device 2 receives the encrypted content data from the memory device 3, the encrypted content data is input to the cryptographic block 14. The cryptographic block 14 decrypts the encrypted content data. The plaintext content data obtained by decryption is input to the CPU 11 via the main control circuit 13.

As described above, the noise generation module 32 in the cryptographic blocks 21 and 14 (encryption device) according to the present embodiment includes one or more S-box circuits 41 to 44 (second non-linear transformation circuit) that perform non-linear transformation on data input to themselves during an operational period of the S-box circuit (first non-linear transformation circuit) of the cryptographic module 31. Since the S-box circuit exhibits large power-consumption distribution in comparison to a common pseudo random number generator or the like, operating the S-box circuits 41 to 44 during the operational period of the S-box circuit in the cryptographic module 31 enables the noise generation module 32 to generate largely-distributed power consumption noise. This largely-distributed power consumption noise effectively conceals the power consumption characteristics of the cryptographic module 31. Only the noise generation module 32 needs to be additionally provided, with no need for changing the cryptographic algorithm of the cryptographic module 31, which helps avoid complicated design, increase in cost, and the like, that would otherwise be caused by redesigning the cryptographic module 31. In consequence, an effective countermeasure against DPA and CPA attacks is provided readily and at low cost.

The noise generation module 32 in the cryptographic blocks 21 and 14 according to the present embodiment includes multiple S-box circuits 41 to 44. Connecting the multiple S-box circuits 41 to 44 in series further increases the distribution of power consumption noise generated by the noise generation module 32, resulting in concealing the power consumption characteristics of the cryptographic module 31 more effectively.

The cryptographic blocks 21 and 14 according to the present embodiment employs the S-box circuits 41 to 44 having the same bit width and circuit architecture as the S-box circuit in the cryptographic module 31. Employing the bit width and the circuit architecture common to the S-box circuit in the cryptographic module 31 and the S-box circuits 41 to 44 in the noise generation module 32 approximates the characteristics of the power consumption noise of the S-box circuits 41 to 44 to the power consumption characteristics of the S-box circuit in the cryptographic module 31. In consequence, the power consumption characteristics of the cryptographic module 31 are concealed more effectively by the power consumption noise generated by the noise generation module 32.

The S-box circuit 41 in the first stage in the cryptographic blocks 21 and 14 according to the present embodiment receives either the input data D1 (first data) to the cryptographic module 31 or the output data D2 from the cryptographic module 31 (second data) as an initial value. Since the input data D1 and the output data D2 are variable with the entropy being ensured, inputting the input data D1 of the output data D2 to the S-box circuit 41 in the first stage enables operating the S-box circuits 41 to 44 using the initial value with the entropy being ensured. Moreover, no need for an additional computing unit such as a pseudo random number generator for generating an initial value with the entropy being ensured achieves simplified circuit configuration.

The noise generation module 32 in the cryptographic blocks 21 and 14 according to the present embodiment includes the flip-flop 61 (synchronization control circuit) for operating the S-box circuits 41 to 44 in synchronization with the operation of the S-box circuit in the cryptographic module 31. As a result, transition of the power consumption by the cryptographic module 31 synchronizes with transition of the power consumption noise generated by the noise generation module 32, and thus the power consumption characteristics of the cryptographic module 31 are concealed more effectively by the power consumption noise.

The cryptographic block 21 according to the present embodiment provides the memory device 3 with an effective countermeasure against DPA and CPA attacks readily and at low cost.

The cryptographic block 14 according to the present embodiment provides the host device 2 with an effective countermeasure against DPA and CPA attacks readily and at low cost.

The memory system 1 according to the present embodiment provides the memory device 3 and the host device 2 with an effective countermeasure against DPA and CPA attacks readily and at low cost.

Description is given below of various modifications to the configuration of the above-described embodiment. The modifications below can be applied in arbitrary combination.

Modification 1

Figure 6:
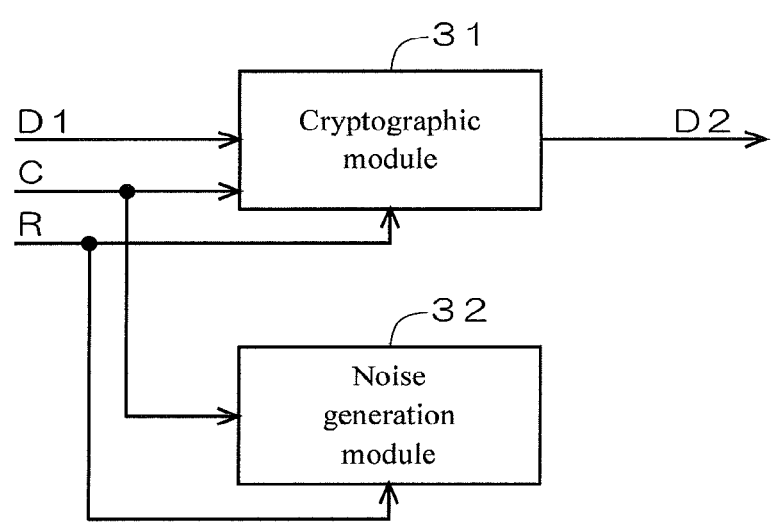
FIG. 6 is a diagram illustrating a first example of the configuration of the cryptographic block according to Modification 1.

FIG. 6 is a diagram illustrating a first example of the configuration of the cryptographic block 21 according to Modification 1. Input of the input data D1 or the output data D2 to the noise generation module 32 is omitted from the configuration illustrated in FIGS. 2 and 3.

Figure 7:
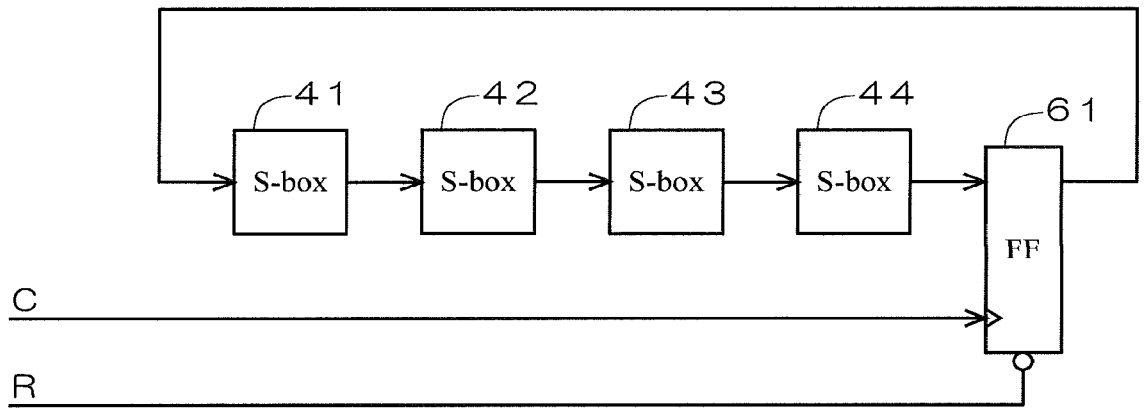
FIG. 7 is a diagram illustrating a circuit configuration of a noise generation module illustrated in FIG. 6.

FIG. 7 is a diagram illustrating a circuit configuration of the noise generation module 32 illustrated in FIG. 6. The selector 51 is omitted from the configuration illustrated in FIG. 5, with the output from the flip-flop 61 being directly connected to the input to the S-box circuit 41 in the first stage.

On assertion of the reset signal R, a predetermined fixed value stored in the flip-flop 61 is input to the S-box circuit 41 in the first stage as an initial value.

Figure 8:
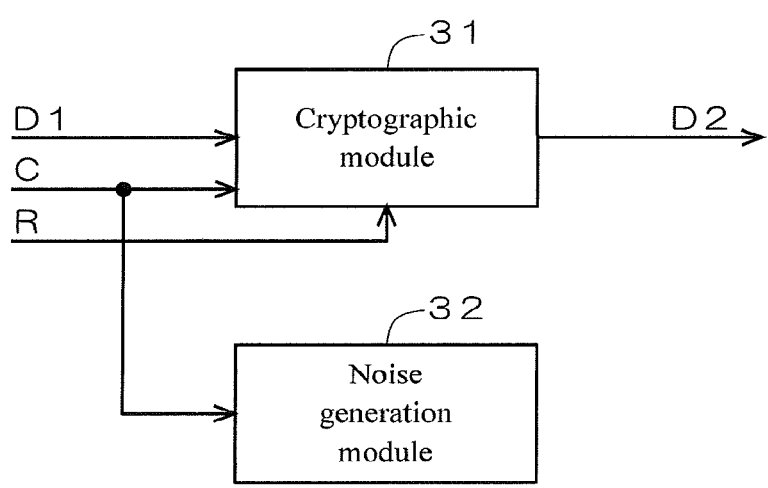
FIG. 8 is a diagram illustrating a second example of the configuration of the cryptographic block according to Modification 1.

FIG. 8 is a diagram illustrating a second example of the configuration of the cryptographic block 21 according to Modification 1. Input of the input data D1 or the output data D2 and input of the reset signal R to the noise generation module 32 are omitted from the configuration illustrated in FIGS. 2 and 3.

Figure 9:
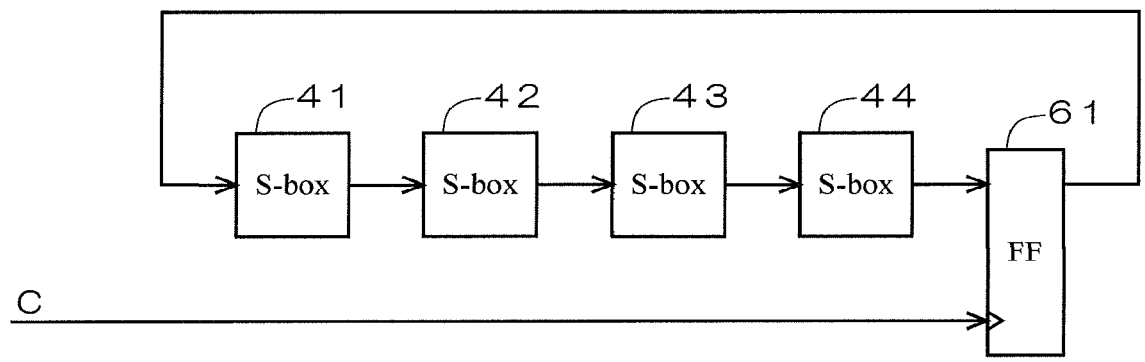
FIG. 9 is a diagram illustrating a circuit configuration of a noise generation module illustrated in FIG. 8.

FIG. 9 is a diagram illustrating a circuit configuration of the noise generation module 32 illustrated in FIG. 8. The selector 51 is omitted from the configuration illustrated in FIG. 5, with the output from the flip-flop 61 being directly connected to the input to the S-box circuit 41 in the first stage. Input of the reset signal R to the flip-flop 61 is also omitted.

When the memory device 3 is connected to the host device 2 and thereby power is turned on to the memory device 3, an undefined value output from the flip-flop 61 is input to the S-box circuit 41 in the first stage as an initial value.

The cryptographic blocks 21 and 14 according to the present modification input a predetermined fixed value or an undefined value to the S-box circuit 41 in the first stage as an initial value. This achieves simplified device configuration, in comparison to the configuration (FIGS. 2, 3, and 5) where the input data D1 or the output data D2 is input to the S-box circuit 41 in the first stage as an initial value, with no need for the selector 51 and wiring for inputting the input data D1 or the output data D2 to the S-box circuit 41.

Modification 2

Figure 10:
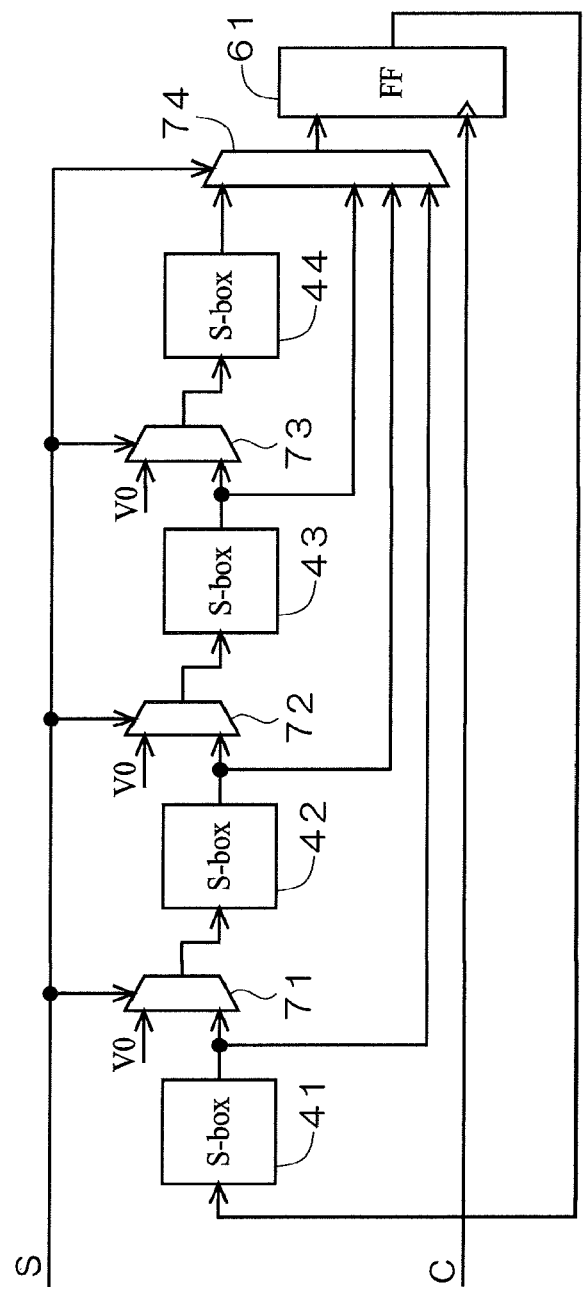
FIG. 10 is a diagram illustrating a circuit configuration of a noise generation module, on the basis of the configuration illustrated in FIG. 9.

FIG. 10 is a diagram illustrating a circuit configuration of the noise generation module 32, on the basis of the configuration illustrated in FIG. 9. Selectors 71 to 74 are added to the configuration illustrated in FIG. 9. The first input terminals of the selectors 71 to 73 receive output from the S-box circuits 41 to 43, respectively. The second input terminals of the selectors 71 to 73 receive a predetermined fixed value V0 (for example, 00h). The first to fourth input terminals of the selector 74 receive output from the S-box circuits 41 to 44, respectively. The noise generation module 32 switches the selectors 71 to 74 with a selection signal S, so as to variably set the effective number of stages of the S-box circuits 41 to 44 connected in series.

Description is given below of an example of setting the effective number of stages to two stages. In this example, the selection signal S causes the selectors 71 and 73 to select the first input terminal, while causing the selectors 72 and 74 to select the second input terminal. The selector 71 selects the first input terminal and the selector 74 selects the second input terminal, so as to constitute a feedback loop including two-stage S-box circuits 41 and 42, i.e., S-box circuit 41→selector 71→S-box circuit 42→selector 74→flip-flop 61→S-box circuit 41. In contrast, the selector 72 selects the second input terminal, so that the S-box circuit 43 keeps receiving the fixed value V0. Thus, output from the S-box circuit 43 is also fixed, and the S-box circuit 44 keeps receiving the fixed value, from the S-box circuit 43 via the selector 73. In consequence, the S-box circuits 43 and 44 do not oscillate, which prevents power consumption due to oscillation.

The noise generation module 32 in the cryptographic blocks 21 and 14 according to the present modification includes the selectors 71 to 74 (selection circuit) for selecting the number of stages of the S-box circuits to operate, from all S-box circuits 41 to 44 provided. When the effectiveness of concealing is highly required, the distribution of the power consumption noise generated by the noise generation module 32 is effectively increased by setting a large number of S-box circuits to operate. On the other hand, when the effectiveness of concealing is not highly required, the power consumption of the cryptographic blocks 21 and 14 as a whole is effectively reduced by setting a small number of S-box circuits to operate.

Modification 3

In the example of the above embodiment, the S-box circuit in the cryptographic module 31 and the S-box circuits 41 to 44 in the noise generation module 32 have the same bit width (8 bits in both), but may have a different bit width.

AES employs 8 bits for the bit width of the S-box, while Minalpher employs 4 bits. The cryptographic module 31 employs Minalpher as the cryptographic algorithm, while the noise generation module 32 employs AES as the cryptographic algorithm. The S-box circuits 41 to 44 in the noise generation module 32 therefore have a larger bit width than the S-box circuit in the cryptographic module 31.

The cryptographic blocks 21 and 14 according to the present modification employ an S-box circuit having a bit width larger than that of the S-box circuit in the cryptographic module 31 for the S-box circuits 41 to 44 in the noise generation module 32. Since the power-consumption distribution becomes larger as the bit width increases, employing the S-box circuits 41 to 44 having a bit width larger than that of the S-box circuit in the cryptographic module 31 enables the noise generation module 32 to generate power consumption noise more largely-distributed than the power consumption characteristics of the cryptographic module 31. In consequence, the power consumption characteristics of the cryptographic module 31 are concealed more effectively by the power consumption noise generated by the noise generation module 32.

Modification 4

In the example of the above embodiment, the S-box circuit in the cryptographic module 31 and the S-box circuits 41 to 44 in the noise generation module 32 employ the same circuit architecture (both based on composite-field technique), but may employ different circuit architecture.

For example, the S-box circuit in the cryptographic module 31 employs an S-box circuit in table method with comparatively small power-consumption distribution, while the S-box circuits 41 to 44 in the noise generation module 32 employ an S-box circuit based on composite-field technique with comparatively large power-consumption distribution. S-box circuits in table method require large amount of resources, but the present modification is applied to the cryptographic block 14 in the host device 2 without great difficulty, since the host device 2 has ample resources in comparison to the memory device 3. When the memory device 3 has ample resources, the present modification may be applied to the cryptographic block 21 in the memory device 3.

The cryptographic blocks 21 and 14 according to the present modification employ an S-box circuit based on a circuit architecture having a power-consumption distribution larger than that of the S-box circuit in the cryptographic module 31 for the S-box circuits 41 to 44 in the noise generation module 32. This enables the noise generation module 32 to generate power consumption noise more largely-distributed than the power consumption characteristics of the cryptographic module 31. In consequence, the power consumption characteristics of the cryptographic module 31 are concealed more effectively by the power consumption noise generated by the noise generation module 32.

Modification 5

In the example of the above embodiment, the cryptographic module 31 and the noise generation module 32 are both configured as hardware, while the same processes as the cryptographic module 31 may be performed by software processing.

Figure 11:
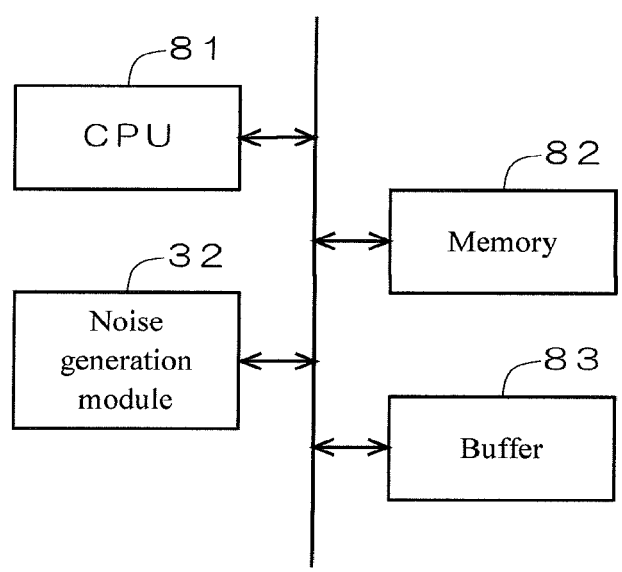
FIG. 11 is a diagram illustrating a configuration of a cryptographic block of a host device.

FIG. 11 is a diagram illustrating a configuration of the cryptographic block 14 of the host device 2. As illustrated in FIG. 11, the cryptographic block 14 includes a CPU 81, a memory 82, a buffer 83, and the noise generation module 32, connected to each other via a bus. The CPU 81 reads target data from the memory 82, processes the data, and stores the result of processing in the buffer 83, so as to perform the same encryption and decryption as the cryptographic module 31 of hardware configuration. When the memory device 3 is equipped with a CPU, the present modification may be applied to the cryptographic block 21 in the memory device 3.

Modification 6

In the example of the above embodiment, the cryptographic module 31 and the noise generation module 32 are both configured as hardware, while the same processes as the noise generation module 32 may be performed by software processing.

Figure 12:
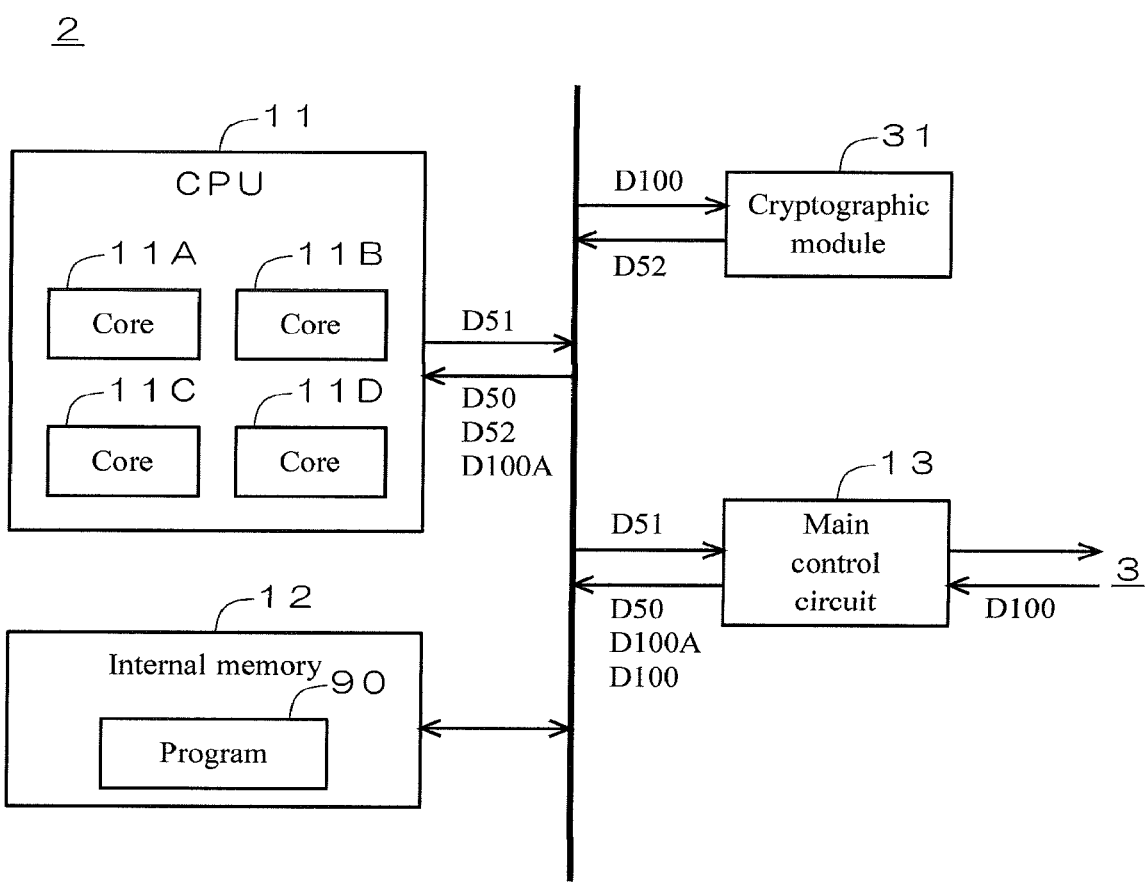
FIG. 12 is a simplified diagram illustrating a configuration of the host device.

FIG. 12 is a simplified diagram illustrating a configuration of the host device 2. As illustrated in FIG. 12, the host device 2 includes a multi-core CPU 11 with multiple cores 11A to 11D, an internal memory 12 that stores a program 90, a cryptographic module 31 configured as hardware, and a main control circuit 13 such as a memory controller. The CPU 11, the internal memory 12, the cryptographic module 31, and the main control circuit 13 are connected to each other via a bus. The CPU 11 serves as a noise generation module by reading the program 90 from the internal memory 12 and executing it. A software processing device such as a GPU or a DSP may be employed in place of the CPU.

Description is given below of the operation of the host device 2 according to the present modification. Encrypted data D100 read from the memory device 3 is input to the main control circuit 13.

When input of a predetermined size's worth of encrypted data D100A is completed, the main control circuit 13 inputs a notification signal D50 regarding the completion to the CPU 11.

On receipt of the notification signal D50, the core 11A obtains the encrypted data D100A from the main control circuit 13. Then notification signal D51 notifying that obtainment of the encrypted data D100A is completed is input to the main control circuit 13.

On receipt of the notification signal D51, the main control circuit 13 inputs the encrypted data D100 to the cryptographic module 31.

The core 11A checks the operational status of the cores 11B to 11D to identify at least one (preferably two or more) nonoperational core. This example assumes that the cores 11B to 11D are all nonoperational.

The core 11A causes the nonoperational cores 11B to 11D to start non-linear transformation using the encrypted data D100A as an initial value. The core 11A also causes the cryptographic module 31 to start decryption of the encrypted data D100. Then the core 11A itself starts non-linear transformation using the encrypted data D100A as an initial value. The cores 11A to 11D repeatedly perform non-linear transformation, using the data obtained by non-linear transformation as the next input data. Thereby non-linear transformation by the S-box circuit in the cryptographic module 31 (hardware processing) and non-linear transformation by the cores 11A to 11D (software processing) are performed simultaneously. In other words, the cores 11A to 11D serve as a noise generation module for generating power consumption noise to the conceal the power consumption characteristics of the cryptographic module 31.

The bit width in non-linear transformation by the cores 11A to 11D may be the same as the bit width of the S-box circuit in the cryptographic module 31, as in the above embodiment. Alternatively, it may be larger than the bit width of the S-box circuit in the cryptographic module 31, as in Modification 3.

The initial value in non-linear transformation by the cores 11A to 11D may be a predetermined fixed value, instead of the encrypted data D100A, as in Modification 1. This facilitates the design, and reduces the load by software implementation. When the cryptographic module 31 performs encryption, part of data output from the cryptographic module 31 may be used as the initial value.

When decryption of the encrypted data D100 is completed, the cryptographic module 31 inputs an interrupt signal D52 notifying the completion to the core 11A.

On receipt of the interrupt signal D52, the core 11A causes the cores 11B to 11D to terminate non-linear transformation, and the core 11A itself terminates non-linear transformation. Thereby the cores 11A to 11D returns to normal processing.

The host device 2 according to the present modification performs non-linear transformation by software processing by the cores 11A to 11D (data processing units). Since the host device 2 does not require an S-box circuit configured as hardware, an equivalent function can be additionally provided by the upgrade of firmware or the like, and thus an effective countermeasure against DPA and CPA attacks is provided readily and at low cost.

In the host device 2 according to the present modification, at least one nonoperational core (preferably two or more cores) of the multiple cores 11A to 11D performs non-linear transformation. Causing nonoperational one of the cores to perform non-linear transformation realizes economical use of existing resources.

While the example of providing the host device 2 with the noise generation module by software processing is described above, the present modification may be applied to the cryptographic block 21 in the memory device 3, when the memory device 3 is equipped with a CPU.

While the invention has been described in detail, the foregoing description is in all aspects illustrative and not restrictive. It is understood that numerous other modifications and variations can be devised without departing from the scope of the invention.

What is claimed is:

1. An encryption device, comprising:
cryptographic circuitry configured to encrypt received first data to output second data; and
noise generation circuitry configured to generate power consumption noise to conceal power consumption characteristics of the cryptographic circuitry, wherein
the cryptographic circuitry is configured to perform first non-linear transformation on received data,
the noise generation circuitry is configured to perform second non-linear transformation on received data during an operational period of the first non-linear transformation,
the cryptographic circuitry includes a first non-linear transformation circuit configured to perform the first non-linear transformation by hardware processing,
the noise generation circuitry includes at least one second non-linear transformation circuit configured to perform the second non-linear transformation by hardware processing, and
the noise generation circuitry includes a plurality of the second non-linear transformation circuits connected in series.

2. The encryption device according to claim 1, wherein the second non-linear transformation circuits are non-linear transformation circuits having a bit width and a circuit architecture equivalent to a bit width and a circuit architecture of the first non-linear transformation circuit.

3. The encryption device according to claim 1, wherein the second non-linear transformation circuits are non-linear transformation circuits having a bit width larger than a bit width of the first non-linear transformation circuit.

4. The encryption device according to claim 1, wherein the second non-linear transformation circuits are non-linear transformation circuits based on a circuit architecture having a power-consumption distribution larger than a power-consumption distribution of the first non-linear transformation circuit.

5. The encryption device according to claim 1, wherein the second non-linear transformation circuit in a first stage is configured to receive one of the first data and the second data as an initial value.

6. The encryption device according to claim 1, wherein the second non-linear transformation circuit in a first stage is configured to receive one of a predetermined fixed value and an undefined value as an initial value.

7. The encryption device according to claim 1, wherein the noise generation circuitry further includes a synchronization control circuit configured to cause the second non-linear transformation circuits to operate in synchronization with operation of the first non-linear transformation circuit.

8. The encryption device according to claim 1, wherein the noise generation circuitry further includes a selection circuit configured to select a number of stages of the second non-linear transformation circuits to operate from all of the second non-linear transformation circuits.

9. An encryption device, comprising:
cryptographic circuitry configured to encrypt received first data to output second data; and
noise generation circuitry configured to generate power consumption noise to conceal power consumption characteristics of the cryptographic circuitry, wherein
the cryptographic circuitry is configured to perform first non-linear transformation on received data,
the noise generation circuitry is configured to perform second non-linear transformation on received data during an operational period of the first non-linear transformation,
the cryptographic circuitry includes a first non-linear transformation circuit configured to perform the first non-linear transformation by hardware processing, and
the noise generation circuitry includes at least one data processing circuit configured to perform the second non-linear transformation by software processing, wherein the encryption device further has one of following features (1)-(5):
(1) the data processing circuit is configured to perform the second non-linear transformation with a bit width equivalent to a bit width of the first non-linear transformation circuit;
(2) the data processing circuit is configured to perform the second non-linear transformation with a bit width larger than a bit width of the first non-linear transformation circuit;
(3) the data processing circuit is configured to receive one of the first data and the second data as an initial value;
(4) the data processing circuit is configured to receive one of a predetermined fixed value and an undefined value as an initial value; or
(5) the noise generation circuitry includes a plurality of the data processing circuits, at least one nonoperational data processing circuit of the plurality of the data processing circuits being configured to perform the second non-linear transformation.

10. A memory device configured to be connected to a host device, the memory device comprising:
a memory array configured to store content data; and
an encryption device configured to encrypt content data to be sent to the host device, wherein
the encryption device includes:
cryptographic circuitry configured to encrypt received first data to output second data, and
noise generation circuitry configured to generate power consumption noise to conceal power consumption characteristics of the cryptographic circuitry,
the cryptographic circuitry is configured to perform first non-linear transformation on received data,
the noise generation circuitry is configured to perform second non-linear transformation on received data during an operational period of the first non-linear transformation,
the cryptographic circuitry includes a first non-linear transformation circuit configured to perform the first non-linear transformation by hardware processing,
the noise generation circuitry includes at least one second non-linear transformation circuit configured to perform the second non-linear transformation by hardware processing, and
the noise generation circuitry includes a plurality of the second non-linear transformation circuits connected in series.

* * * * *